United States Patent

Zambone

[15] 3,700,705

[45] Oct. 24, 1972

[54] METHOD OF REFINING TRIGLYCERIDES

[72] Inventor: Albert S. Zambone, Vineland, N.J.

[73] Assignee: Pennwalt Corporation, Philadelphia, Pa.

[22] Filed: April 16, 1970

[21] Appl. No.: 29,275

[52] U.S. Cl. ................................................260/425
[51] Int. Cl. ..........................................C08h 17/36
[58] Field of Search......................................260/425

[56] References Cited

UNITED STATES PATENTS

| | | | |
|---|---|---|---|
| 2,838,553 | 6/1958 | Ayres et al. | 260/425 |
| 3,053,440 | 9/1962 | Doyle et al. | 260/425 |
| 3,085,101 | 4/1963 | Eger et al. | 260/425 |
| 2,848,468 | 8/1958 | Wijnberg | 260/425 |

*Primary Examiner*—Lewis Gotts
*Assistant Examiner*—Ethel G. Love
*Attorney*—Carl A. Hechmer, Jr. and Edward A. Sager

[57] ABSTRACT

In triglyceride refining, with soapstock produced as a by-product, the mixture resulting from the introduction of an alkaline reagent is separated by introducing it to a zone of centrifugation formed about an axis and in which the soapstock occupies an outer portion of the zone and the refined triglyceride occupies an inner portion of said zone, and the refined triglyceride is withdrawn from the zone, the separated soapstock is uniquely withdrawn from the zone by advancing it axially and inwardly toward the axis away from the refined triglyceride, and then discharging the separated soapstock from said zone.

16 Claims, No Drawings

METHOD OF REFINING TRIGLYCERIDES

This application is a companion to application Ser. No. 15,238, filed Feb. 27, 1970 by the same inventor, and to which reference is hereby made.

This invention related to a method of refining triglycerides, and more particularly to the refining of various animal and vegetable materials for the production of edible and inedible fats and oils, with soapstock produced as a by-product.

The satisfactory refining of raw triglyceride materials usually involves adding sodium hydroxide or another suitable alkaline reagent to a filtered triglyceride. In the case of crude triglyceride oils from vegetable oil seeds, the latter may have been previously dehulled, cooked, pressed, and separated from the solids cake. In the case of crude triglyceride oils from animal sources, such oils may have been derived from conventional wet or dry rendering processes. In either case, the addition and mixing of the alkaline reagent with the crude oil further involves elevating the temperature of the liquid mixture and separating the resultant heavier liquid soapstock from the lighter refined oil. Although in the early days of such refining the foregoing steps were done in a batch kettle, in recent times continuous processing has been carried out by injecting the reagent into a conduit for the raw oil and effecting heating in one or more heat exchangers after which separation is done continuously by centrifugation. The separated liquid soapstock may be delivered as feed to any one of a variety of other processes, depending upon the desired end product, while the separated oil is usually mixed with water and again centrifuged in order to further reduce the soap content of the separated oil. The oil from this water washing treatment is forwarded as feed to other processes for conversion into the desired end product.

The foregoing conventional process suffers from a number of disadvantages. These include the necessity of filtration prior to centrifuging in order to remove undesirable solids, usually protein or fibrous solids comprising up to 3 percent of the feed, partly because such solids contaminate the end product but more importantly because they plug up disc type centrifuges used for separation. A disadvantage involved in the prior filtration of feed is the requirement of manual disassembly of the filter for cleaning and the occasional replacement of filter media. Even with filtration efficiency of 99 percent and upwards, the periodic disassembly and cleaning of the centrifuge apparatus, required to remove the accumulated solids which escape the filter, is a further disadvantage of such conventional refining plants. When a centrifuge is cleaned, it not only entails labor and interruption of the process, but also the cost of replacement parts such as seals, discs and the like.

The aforesaid conventional process carries out the liquid-liquid separation step by means of a relatively high speed centrifuge having an internal disc stack to promote separation, and which subjects the feed to about 8000 times the force of gravity. The separated solids accumulated on the disc stack and especially on the inner surface of the centrifuge bowl require manual removal as aforesaid. Efforts to retard solids deposition by introducing a water or reagent wash are only partially effective, as is back-flushing the machine, the latter being also disadvantageous from the standpoint of process continuity.

When conventional refining centrifuges are employed to effect centrifugal separation, it is essential that the concentration of the alkaline reagent be carefully controlled, as well as the quantity thereof which exceeds the stoichiometric requirement. This is required, not only to avoid saponification of the triglyceride, but also to prevent formation of a soapstock which is so hard, viscous or stiff as to be difficult or impossible to discharge from the centrifuge, whether or not a water or reagent flush is employed. In the absence of proper reagent proportioning, the centrifuge will become plugged with the hard soap mass, necessitating cleaning and resulting in interruption of the process.

The present invention seeks to obviate the foregoing disadvantages of conventional triglyceride refining in a manner to be described more fully hereinafter.

The present invention is especially applicable to refining edible triglycerides derived from cotton, rape, sesame, soy, coco, lard and tallow; also inedible fats, tallow and grease.

Briefly stated, the present invention retains the conventional steps of adding an alkaline reagent such as aqueous sodium hydroxide to the crude oil being refined, for example a stream of rendered fat or vegetable oil, either of which contains triglycerides. Optionally the crude oil is in hexane solution, forming a miscella. The present invention also retains the step of heating by means of a heat exchanger, the mixture just described and which may also contain traces of other lipids, fatty acid in solution with the triglycerides, and protein and/or fibrous material in suspension.

The present invention overcomes the aforementioned disadvantages of conventional triglyceride refining methods by employing a centrifugal separation method heretofore used only for the separation of solids and liquid from a mixture thereof. The method of the present invention preferably employs a known machine for carrying out several method steps. Such known machine is a decanter type centrifuge having an imperforate and elongated solid bowl disposed within a housing. A major portion of the bowl is of cylindrical shape and a minor portion thereof is of conical configuration at one end of the bowl and tapering, or decreasing in diameter, toward that end. The bowl is adapted to be motor-driven for rotation about its longitudinal axis at speeds applying to the feed up to 3000 times the force of gravity and beyond. A helical screw conveyor is mounted on a hollow shaft or hub extending coaxially of the bowl. The bowl and screw conveyor are arranged to rotate on a common axis, preferably with a speed differential of from 5 to 60 r.p.m. in order to move the soapstock and other matter heavier than oil to the discharge port at the tapered end of the bowl, while the lighter liquid oil is discharged from the other end of the bowl. A detailed description of the construction of the general type of centrifuge which may be employed in practicing the present invention is omitted herefrom for the sake of brevity. Instead, the centrifuge constructions disclosed in U.S. Pat. Nos. 2,679,974 and 2,703,676 of F. P. Gooch; also U.S. Pat. No. 3,148,145 of K. G. Reed; and U.S. Pat. No. 3,172,851 of C. M. Ambler, are incorporated herein by reference. The cited patents are assigned to the assignee of the present invention.

The construction of the cited Ambler patent is distinguishable from the other cited constructions in that the discharge port in the tapered end of the bowl is radially more distant from the rotational axis than is the discharge port for the lighter phase material, the refined triglycerides - either vegetable or animal fat. Of course it is to be understood that according to the present invention heavy phase material, comprising sodium soaps, water, traces of other lipids, and protein and/or fibrous material in liquid or solid suspension, is to be discharged through the discharge port at the tapered end of the centrifuge bowl. In the cited Gooch and Reed centrifuges, the discharge port for the heavier phase separated material is radially closer to the rotational axis than is the discharge port for the light phase material, so that there is even less chance of the two phases being discharged together from the tapered end of the bowl. As the heavy phase soapstock material is conveyed up the inclined beach or slope by the axial screw conveyor, it passes through the lighter phase liquid and then air on its way to the discharge port, all the while being subjected to centrifugal force. The screw conveyor gently works the heavy phase material being conveyed up the inclined beach or slope, the kneading action promoting coalescence of the occluded oil droplets and ultimate bleeding or extracting of the coalesced droplets from the soap mass. This action continues as the soap mass passes out of the lighter phase liquid or oil into air while proceeding along the tapered end of the bowl, with the extracted oil flowing under centrifugal force back to the light phase oil layer, as the relatively oil-free soapstock proceeds to its discharge port.

It is known that dark crude oil can be refined to a desirably light color, the degree of color reduction being proportional to the quantity and concentration of the alkaline reagent. This has presented a problem to refiners using conventional refining methods because with the addition of higher quantities and/or concentration of alkaline reagent the soapstock becomes progressively harder, stiffer, less flowable and therefore more difficult to discharge from the centrifuge without plugging the flow passageways therein. Attempts to relieve this problem by diluting the soapstock by water or reagent flush steps have met with only partial success, because they are not entirely effective when applied to very stiff or very hard soapstocks; and furthermore there is a cost disadvantage involved in the use and disposal of the flush liquid. The present invention therefore represents substantial progress in the art of triglyceride refining.

An important advantage of the present invention over the prior practice is that centrifuging according to the present invention eliminates the need for prior filtration since there is no longer a danger of the protein and/or fibrous material plugging the centrifuge for the flow passages therein. Rather, the centrifuge is truly self-cleaning and therefore may be operated continuously in the refining of triglycerides, without the need for shut-down to perform manual cleaning.

According to the present invention crude triglyceride in liquid form is provided, as in the aforementioned conventional processes. Next a suitable alkaline reagent, such as aqueous sodium hydroxide, is added to the crude triglyceride up to an amount beyond the stoichiometric quantity required to neutralize the free fatty acid therein. The alkaline addition produces a reaction yielding soapstock suspended in triglyceride. The concentration of the alkaline reagent may be increased to make a solid soapstock, if desired, although the centrifugation step in the method of the present invention is effective to separate the soapstock and the triglyceride without plugging the centrifuge whether the soapstock is in liquid or solid form. Likewise the soapstock may be placed in solid form, optionally, by introducing a suitably sufficient quantity of alkaline reagent beyond the stoichiometric requirement for neutralizing the free fatty acid. The centrifuging step, as with the aforementioned centrifuges, separates the soapstock and the triglyceride in a zone of centrifugation under a centrifugal force sufficient to separate the soapstock and triglyceride into respective outer and inner layers within the zone. By the action of the screw conveyor, the outer layer of soapstock is moved axially and inwardly, toward the axis of rotation, to bring it through and out of the inner layer of triglyceride while still under centrifugal force from the rotation of the centrifuge bowl. The advancing of the soapstock can be performed continuously or intermittently as disclosed in U.S. Pat. No. 3,494,542, which issued in the names of Craig et al. on Feb. 10, 1970. Extraction of occluded triglyceride is effected as aforesaid by the kneading of the soapstock under centrifugal force. The occluded triglyceride that is thus separated flows back down the tapered portion of the centrifuge bowl into the main centrifuging zone where it rejoins the triglyceride layer and ultimately is discharged. The final separated triglyceride is separately discharged, preferably by movement in opposite axial direction, toward and out a liquid discharge port of the centrifuge. The final separated soapstock is discharged from a discharge port at the tapered end portion of the centrifuge bowl.

Optionally the crude triglyceride may be in hexane solution, forming a miscella.

When the soapstock is in liquid form the present invention assumes that the heavier phase liquid soapstock material is more viscous, i.e., possesses a higher viscosity, than the lighter phase liquid triglyceride material. The present invention is not operative where the light phase liquid material is more viscous than the heavy phase liquid material. The term "liquid" as used herein is applicable to non-gaseous flowable or fluid materials having a broad range of viscosities, such as those which take the shape of a container and seek the lowest level. This is to be distinguished from solid soapstock material, where the term "solid" as used herein is applicable to non-flowable materials, such as those having a definite shape and which offer resistance to a deforming force.

From the foregoing it can be seen that the process herein disclosed is more advantageous than previously known triglyceride refining processes. Not only may filters be eliminated, as well as the need for interrupting a process to clean a plugged or unbalanced centrifuge, but soapstock may be produced in a more concentrated form containing less occluded triglyceride, on a dry basis, than was heretofore possible.

What is claimed is:

1. In a process of refining triglycerides including the steps of:

a. providing crude triglyceride in liquid form containing free fatty acid in solution therewith,
b. adding to said triglyceride an alkaline reagent material up to an amount beyond the stoichiometric quantity required to neutralize the free fatty acid and to produce by reaction therebetween a soapstock suspended in the triglyceride phase; and
c. centrifugally separating the soapstock and the triglyceride in a zone of centrifugation under a centrifugal force sufficient to separate into respective outer and inner layers the soapstock and the triglyceride;

the further steps of:

d. advancing the soapstock layer axially in the zone and inwardly toward the axis of rotation to bring it through and out of the layer of triglyceride while applying centrifugal force to said advancing layer of soapstock, and
e. discharging the final separated soapstock and the final separated triglyceride separately from the zone of centrifugation.

2. A process according to claim 1 wherein the soapstock is a liquid.

3. A process according to claim 2 wherein the liquid soapstock is substantially more viscous than the triglyceride.

4. A process according to claim 1 wherein the feed is unfiltered.

5. A process according to claim 1 wherein the feed is in hexane solution.

6. A process according to claim 1 wherein the soapstock is a solid.

7. A process according to claim 1 wherein the step (b) of adding alkaline reagent involves increasing the concentration of the alkaline reagent to make said soapstock a solid.

8. A process according to claim 1 wherein the step (b) of adding alkaline reagent involves introducing a quantity of alkaline reagent beyond the stoichiometric requirement to neutralize the free fatty acid, sufficient to make said soapstock a solid.

9. A process according to claim 1 wherein the alkaline reagent is aqueous sodium hydroxide, and the crude triglyceride is rendered fat containing triglycerides and traces of other lipids, fatty acid in solution with said triglycerides, and protein in suspension, and the soapstock primarily comprises sodium soaps, water, traces of other lipids, and protein in suspension.

10. A process according to claim 1 wherein the alkaline reagent is aqueous sodium hydroxide, and the crude triglyceride is vegetable oil containing triglycerides and traces of other lipids, and fibrous material and protein in suspension.

11. The process according to claim 1 wherein triglyceride occluded in the soapstock advancing through and out of the layer of triglyceride is extracted from said soapstock and moved by centrifugal force back toward the main zone of centrifugation and into the layer of triglyceride.

12. The process according to claim 11 wherein said triglyceride is extracted from the soapstock advancing through and out of the layer of triglyceride by kneading said advancing soapstock.

13. The process according to claim 1 wherein the final separated triglyceride is moved for discharge axially out of the zone in an axial direction opposite that of the advancing of said soapstock layer.

14. In a process of refining triglycerides including the steps of:

a. providing crude triglyceride containing free fatty acid in solution therewith,
b. adding to said triglyceride an alkaline reagent material up to an amount beyond the stoichiometric quantity required to neutralize the free fatty acid and to produce by reaction therewith a soapstock suspended in the triglyceride; and
c. centrifugally separating the soapstock and the triglyceride in a zone of centrifugation under a centrifugal force sufficient to separate the soapstock and the triglyceride into respective outer and inner layers within said zone;

the further steps of:

d. advancing the soapstock layer in the zone axially and inwardly toward the axis of rotation from under the layer of triglyceride while continuing the application of centrifugal force to said advancing layer of soapstock, and
e. discharging the final separated soapstock and the final separated triglyceride separately from the zone of centrifugation.

15. A triglyceride product made by the process of: providing feed comprising crude triglyceride containing free fatty acid in solution therewith, adding an alkaline reagent material up to an amount beyond the stoichiometric quantity required to neutralize the free fatty acid and to produce by reaction therebetween a soapstock suspended in the triglyceride phase, centrifugally separating the heavier soapstock and the lighter triglyceride in a zone of centrifugation under a centrifugal force sufficient to separate into layers the soapstock and the triglyceride while advancing the soapstock layer axially in the zone and inwardly toward the axis of rotation to bring it through and out of the layer of triglyceride by thereafter continuing the application of centrifugal force to said advancing layer of soapstock, and discharging the final separated soapstock and the final separated triglyceride separately from the zone of centrifugation.

16. The method according to claim 1 wherein the advancing step is performed intermittently while the final separated triglyceride is discharged continuously.

* * * * *